Sept. 4, 1951 E. T. HOWES 2,566,566
TORSION INDICATING DEVICE
Filed Dec. 19, 1945 2 Sheets-Sheet 1

INVENTOR.
EDGAR T. HOWES
BY
Christie & Angus
ATTORNEYS

Sept. 4, 1951 E. T. HOWES 2,566,566
TORSION INDICATING DEVICE
Filed Dec. 19, 1945 2 Sheets—Sheet 2
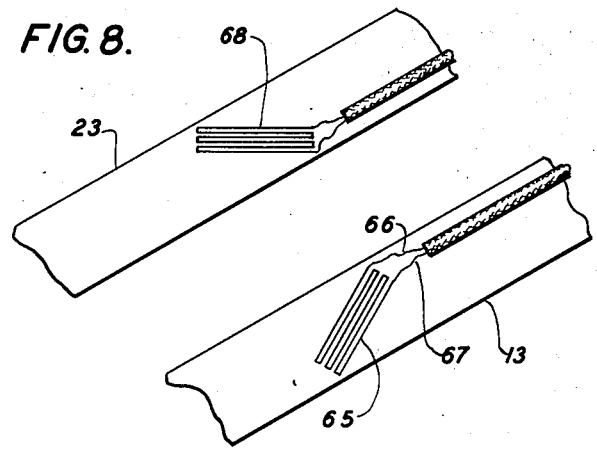
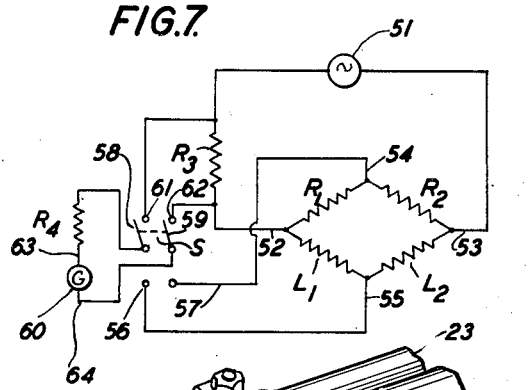
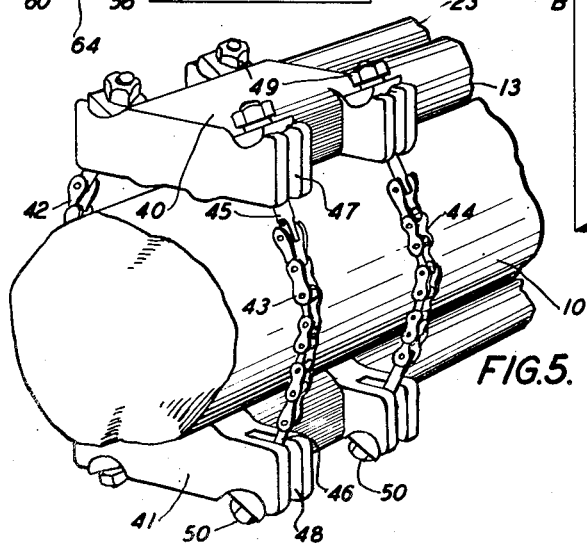
INVENTOR.
EDGAR T. HOWES
BY
Christie & Angus
ATTORNEYS Patented Sept. 4, 1951

2,566,566

UNITED STATES PATENT OFFICE 2,566,566

TORSION INDICATING DEVICE

Edgar T. Howes, Pasadena, Calif.

Application December 19, 1945, Serial No. 635,915

7 Claims. (Cl. 73—136)

This invention relates to the measurement of torsional forces, such as the torque on a rotating shaft. It is especially applicable to measuring the torque on a heavy power shaft.

The principal object is to provide a simple and effective means by which increments of torsion load produce easily ascertainable increments on an indicator.

I carry out my invention by attaching to the shaft whose torque is to be measured, an auxiliary shaft which I use as a gauge indicator to which I attach the indicating means. I have found that when the gauge element, for example, a length of shaft, ordinarily of smaller diameter than the power shaft, is attached to the power shaft at two places, the twist due to the torsion load on the power shaft is imparted to the gauge shaft, and that the gauge shaft undergoes the same angular twist per unit length as the power shaft. Furthermore, there is a proportionality between the torsion load on the power shaft and the torsion load on the gauge shaft, so long as the gauge shaft is of small diameter relative to that of the power shaft.

I make use of this principle by rigidly attaching to the shaft whose torque is to be measured, a pair of supporting elements or brackets at a spaced distance apart longitudinally along the shaft; and I support the gauge shaft at these supports so that the gauge shaft lies uniformly spaced and parallel to the main shaft. I rigidly fasten the gauge shaft to each of the brackets so that when the mainshaft undergoes an angular twist along its length which lies between the two brackets, the gauge shaft is correspondingly twisted.

From the twist of the gauge shaft, I may obtain an indication of the torsion stress in the main shaft in any suitable manner, for example, by measuring the strain of the gauge shaft by a suitable strain gauge, or by measuring the change of magnetic properties when the gauge shaft is of a magnetic material.

Although there are several ways of producing the desired indication of strain or stress at the gauge shaft, I prefer to produce the indication by means of an indicating circuit of the type shown in my co-pending applications Serial No. 551,598 filed August 28, 1944, entitled Stress Measurement, which is now abandoned, and Serial No. 629,850 filed November 20, 1945, entitled Load Responsive Device, executed by me on November 16, 1945. These co-pending applications describe and claim electrical measuring circuits for producing load indications in response to change of magnetic properties produced by the load; and my application Serial No. 551,598 particularly shows the measurement of torsion load by such circuits.

My present application is an improvement over the method of torsion measurement shown in said application Serial No. 551,598 in that in the present application I make use of the gauge shaft or rod attached to the main shaft. The indications of the indicator may be calibrated to read the torsion stress at the gauge shaft; and as there is a relationship between the stress at the gauge shaft and the stress at the main shaft, the torsion stress at the main shaft can be computed after first measuring the stress at the gauge shaft. According to a preferred feature of my invention, I provide an adjustable bracketing or fastening arrangement so that the gauge shaft can be fitted to different sizes of main shafts.

My invention will be better understood from the following detailed description taken in conjunction with the accompanying drawings of which:

Fig. 5 shows a modification of the shaft bracket arrangement shown in Fig. 2;

Fig. 6 shows B—H curves of permeability changes under different torsion loads on one of my gauge shafts;

Fig. 7 shows a bridge type of measuring circuit like that shown in my application Serial No. 551,598 by which electrical measurements are made to furnish the load indication; and Fig. 8 shows the application of a strain gauge to the gauge shafts of Figs. 2 and 3 instead of the measuring coils shown in Figs. 2 and 3.

Figure 1:
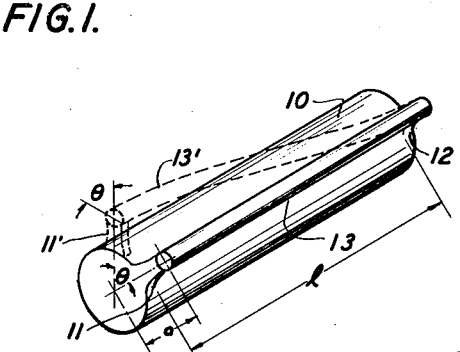
Fig. 1 shows a construction of a gauge shaft upon a main shaft according to my invention.

Referring to Fig. 1, there is shown a length of shaft 10, for example, a section of a power shaft, adapted to carry a torsion load. There is attached at one side of shaft 10 a pair of rigid supports or brackets 11 and 12. A gauge shaft 13 of smaller diameter than the main shaft is attached at each end to the respective brackets 11 and 12. The arrangement is such that absolute rigidity is maintained and the gauge shaft 13 is rigidly held at a uniform distance from the axis of the main shaft 10 and parallel to it. The rigidity of the construction may be had in any suitable way, for example, by welding the brackets to the two shafts.

When torque is applied to the main shaft 10, for example, by holding one end of it fixed and applying a twisting force to the other, or by driving a load from the shaft while rotating it, the shaft undergoes an angular twist according to the load. For the distance $l$ between the two supports 11 and 12, the main shaft will twist through an angle $\theta$ which will depend on the load. This will cause bracket 11 to move through the same angle $\theta$, relative to its original position, to a new position shown by the dotted lines at 11'. In consequence, the gauge shaft 13 will assume a complex twist, somewhat in the shape shown by the dotted line 13'. In addition to undergoing the linear twist shown, the shaft 13 will also undergo an angular twist through its length between the supports, which is the same angular twist as that of the main shaft. In consequence, the torsional strain of the auxiliary shaft will be a sample of the torsional strain of the main shaft.

In such an arrangement, the relationships are as follows:

Assuming that the center of the gauge shaft 13 is located at a distance $a$ from the center of the main shaft 10, and neglecting the shear absorbed by the auxiliary shaft, then $$d\theta = \frac{\theta dx}{l} \quad (1)$$

where $dx$ is an increment of the length $l$. If $d\theta$ and $a$ of Fig. 1 are expressed in circular measurement, the arc AB, which is the arc of twist of the main shaft, is $$AB = r d\theta \quad (2)$$

and also $$AB = a dx \quad (3)$$

It follows that:

$$a = \frac{r d\theta}{dx} = \frac{r\theta}{l} \quad (4)$$

According to Hooke's law, the deformation within the elastic limit is proportional to the stress $S$ which produces the deformation. Thus, the modulus of shear $G$, which is a constant, is the ratio of stress to deformation, i. e.

$$G = \frac{S}{a} \quad (5)$$

and $$S = aG = \frac{Gr\theta}{l} \quad (6)$$

The shear stress varies at different distances from the center of the shaft and is a maximum at the circumference. This maximum shear stress $S_s$ at the radius $r$ of the main shaft is given by the equation $$S_s = \frac{Gr\theta}{l} \quad (7)$$

from which it follows that $$\theta = \frac{S_s l}{Gr} \quad (8)$$

Since $\theta$ is the angle of twist for both the main shaft and the gauge shaft, $$\frac{S_s l}{Gr} = \frac{S'_s l}{G' r'} \quad (9)$$

and $$S'_s = S_s \cdot \frac{r'}{r} \cdot \frac{G'}{G} \quad (10)$$

where $S_s$ is the maximum shear of the main shaft.
$S'_s$ = the maximum shear of the gauge shaft.
$r$ = the radius of the main shaft.
$r'$ = the radius of the gauge shaft.
$l$ = the length of the section.
$G$ = the modulus of shear of the main shaft.
$G'$ = the modulus of shear of the gauge shaft.

Accordingly, by ascertaining the radii $r$ and $r'$ of the two shafts and also their noduli of shear $G$ and $G'$, the maximum shear of the main shaft can readily be computed from Equation 10 after measuring the shear $S'_s$ of the gauge shaft.

If it should happen that the gauge shaft is not so negligibly small compared with the main shaft as to absorb a negligible amount of shear, the shear which is absorbed by the gauge shaft may be accounted for according to the equation $$T = T_1 + T_2 + M_b \quad (11)$$

where $T$ = the main shaft torque
$T_1$ = the main shaft torque in length $l$
$T_2$ = the gauge shaft torque
$M_b$ = the bending moment or modulus of shear of the gauge shaft.

Then $$T = \frac{S_{s1} \pi r_1^3}{2} + \frac{S_{s2} \pi r_2^3}{2} + \left(\frac{3 E_2 \pi r_2^4 A^2}{L^2 G_1 R_1}\right) S_{s1} \quad (12)$$

$$S_s = S_{s2}\left[\frac{G_1 r_1}{G_2 r_2} + \frac{r_2^3}{r_1^3}\left(1 + \frac{6 E_2 A^2}{G_2 L^2}\right)\right] \quad (13)$$

where $T$ = main shaft torque
$S_s$ = maximum shear stress of main shaft
$S_{s1}$ = shear stress of main shaft in length L
$S_{s2}$ = shear stress of gauge shaft
$r_1$ = radius of main shaft
$r_2$ = radius of gauge shaft
$L$ = length of section
$G_1$ = modulus of shear of the main shaft
$G_2$ = modulus of shear of the gauge shaft
$E_2$ = modulus of elasticity of the gauge shaft
$A$ = distance of gauge shaft from center of main shaft.

Figure 2:
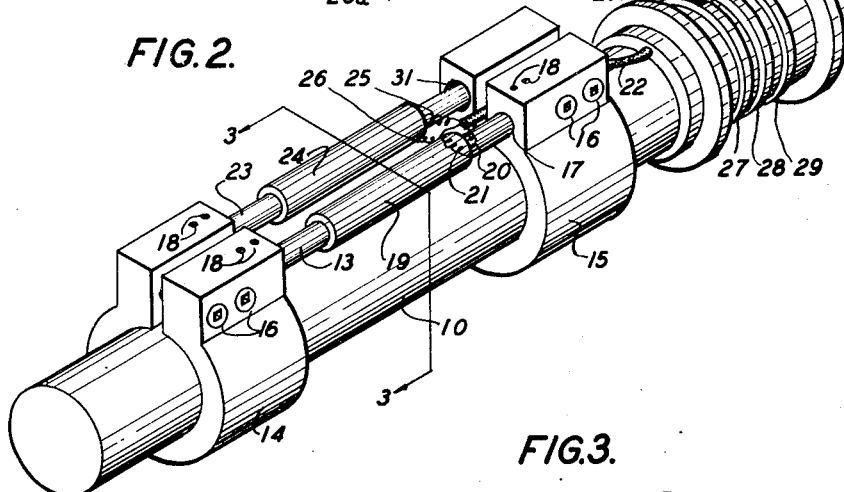
Fig. 2 shows a practical application of a gauge shaft mounted by brackets upon a main shaft which is provided with a collector ring means by which electrical measurements can be made of the stress in the gauge shaft.

In Fig. 2 there is shown a practical application of my invention to a rotating shaft on which torque is applied. The gauge rod or shaft 13 is attached to the rotating main shaft 10 by brackets 14 and 15 adapted to be firmly tightened around the shaft 10 by clamp bolts 16. The gauge element 13 is inserted into bores 17 in the ends of the brackets and firmly held by suitable means such as set screws 18. By this arrangement the shaft 13 is normally held parallel to the shaft 10.

The twist produced in shaft 13 by torque on the shaft 10 is measured electrically by means of a coil 19 placed around shaft 13, and the leads 20 and 21 from the coil are led through a cable 22. As has been explained in application Serial No. 551,598, the change of stress produced in the gauge element 13 will change its permeability which will produce a corresponding change of inductance of coil 19.

It is convenient to indicate this change of inductance by reference to the inductance of a coil around an unstrained shaft; and for this purpose I provide an additional shaft 23 similar to shaft 13 and provided with a coil 24 similar to coil 19. The leads 25 and 26 from coil 24 are also led out through cable 22. Rod 23 is maintained unstrained while rod 13 is being strained because the rod 23 is held by the set screws 18 at only one end and rests free at the other end within a bore 31, which is larger than the rod diameter.

I prefer to connect the leads 21 and 26 together, which will result in only three leads being taken from the shaft. To take these three leads from the shaft there may be provided three slip rings 27, 28 and 29 provided with corresponding brushes 27A, 28A, and 29A from which the leads are taken through cable 30.

Figure 3:
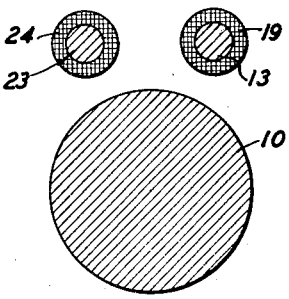
Fig. 3 is a cross-sectional view taken at the line 3—3 of Fig. 2.
Figure 4:
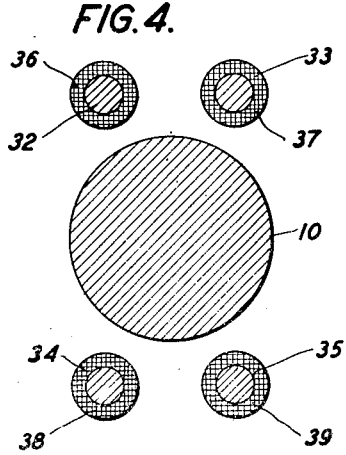
Fig. 4 is a cross-sectional view similar to that of Fig. 3 except that four auxiliary shafts are shown instead of the two auxiliary shafts shown in Fig. 3.

Fig. 3 is a cross-sectional view taken at line 3—3 of Fig. 2, and shows the relative position of the two shafts, 13 and 23. If desired, the arrangement need not necessarily be limited to two shafts, but instead, a greater number of shafts might be used. Fig. 4, for example, shows a cross-sectional view taken at the same place as the cross-section of Fig. 3, in which the system utilizes four shafts 32, 33, 34 and 35. Each shaft has its own coil, these coils being numbered 36, 37, 38 and 39 respectively. Two of the four shafts, for example, shafts 33 and 34, may be fixed at both ends in the manner of shaft 13; and the other two shafts, 32 and 35, may be left free at one end in the same manner as shaft 23. To make the electrical measurement, the coils 37 and 38 around the fixed shafts may be connected in series, and the other two coils, 36 and 39, may be connected in series. In this way the arrangement will be similar to the two-coil arrangements of Fig. 2.

Fig. 5 shows a modification of the construction of Fig. 2 in which the gauge shaft is adapted for mounting on different sized power shafts. In Fig. 5, the mounting bracket on the main shaft, instead of being of fixed diameter such as the brackets 14 and 15 in Fig. 2, can be made variable in diameter. Fig. 5 shows one of these brackets, corresponding to the bracket 14 of Fig. 2. The mounting bracket comprises an upper mounting member 40 and a lower mounting member 41, inter-connected by four chains of which three appear in the figure, these being the chains 42, 43 and 44. Each chain is terminated by an upper terminal pin 45 and a lower terminal pin 46, these terminal pins being passed through respective slots or holes 47 and 48 of the mounting members. Nuts 49 and 50 are threaded to the ends of the terminal pins at the outside of the mounting members. By screwing down on all of the nuts 49 and 50, thereby drawing the terminal pin within the mounting members, the chain can be effectively shortened as described, and in this way the bracket members can be made to fit tightly on shafts varying over a considerable range in diameter.

The gauge shafts 13 and 23 may be fastened to the upper or lower mounting members 40 or 41 as shown. If four such shafts are used, as shown in Fig. 4, two of them will be in the upper mounting member and two in the lower mounting member. The mounting bracket arrangement corresponding to the bracket for support 15 of Fig. 2 can be the same as that shown in Fig. 5.

When the shaft 13 is stressed, its permeability correspondingly varies. Fig. 6 illustrates curves of flux density (B) versus magnetizing force or ampere turns (H) for a steel body such as the rod 13 of Fig. 2, of ordinary steel when subjected to torsion stress. When not subjected to any stress, the B—H curve is as indicated by curve (a). When the torsion load is applied, the permeance becomes decreased, producing less flux density for a given magnetizing force, and the B—H curve is according to curve b, which is below curve a. For further increase in torsion load, the B—H curve drops further as illustrated by curves c and d, curve d being for more load than curve c.

Because of the change of inductance attending a change of permeability, an indication of the stress in the gauge rod 13, can be had by comparing the inductance of coil 19 with the inductance of the coil 24 on the unstrained rod 23. Preferably the two coils 19 and 23 are made identical so that in the absence of stress on rod 13, the inductance of the two coils is the same and should balance each other. The presence of strain in rod 13, however, changes inductance 19, thereby producing an unbalance between the two inductances. This unbalance can be measured by comparing the inductance between terminal 20a and 26a with that between terminal 25a and 26a, corresponding respectively to terminals 20, 26 and 25 of the coils.

A convenient way of measuring the inductance difference or unbalance is shown in Fig. 7 which is a bridge type circuit like that shown in my Fig. 4 of pending application Serial No. 551,598. The bridge comprises the four bridge arms $R_1$, $R_2$, $L_1$ and $L_2$. $L_1$ and $L_2$ represent the coils 19 and 24 respectively; and $R_1$ and $R_2$ are fixed impedances, preferably non-inductive resistances. When $L_1$ is made equal to $L_2$ in inductance, in the absence of load, which is the relationship I prefer, the impedances $R_1$ and $R_2$ should be equal in order that the bridge shall substantially balance under the condition of no load on rod 13.

A source of constant amplitude alternating voltage 51, for example a 60 cycle supply line, is connected across the output terminals 52 and 53 of the bridge, preferably through a non-inductive resistor $R_3$. The output terminals 54 and 55 of the bridge are led to terminals 56 and 57 of a double pole, double throw switch S, the switch arms 58 and 59 of which are connected across a series-arranged resistor $R_4$ and galvanometer 60. The other two terminals 61 and 62 of the switch are connected across resistor $R_3$. By throwing the switch arm 58 and 59 to switch terminals 56 and 57, the resistor $R_4$ and galvanometer 60 are connected across the output of the bridge; and throwing the switch arm the other way connects $R_4$ and galvanometer 60 across resistor $R_3$.

The use of the switch will not always be necessary. It is mainly convenient for switching either the bridge output or a reference voltage from across resistor $R_3$ across the indicator. If desired, the switch could be dispensed with, and the indicator 60 connected directly to the output terminals of the bridge.

With the switch thrown to connect the galvanometer across the bridge output, there will be substantially no current through the galvanometer in the absence of a load on the test rod 13, since the bridge is substantially balanced under this condition. When the gauge element 13 is loaded, however, the bridge will become unbalanced due to the change in inductance of $L_1$ produced by the change in permeance of its core 13; and this unbalance will comprise both an amplitude and a phase unbalanced. The degree of the unbalance, and hence the load on the rod 13, are indicated by the reading on the galvanometer.

A calibration may be made for the gauge so that the indicator reading may be translated directly into torsion loads on the gauge rod 13. I prefer to use for the galvanometer 60 a galvanometer of the well known dynamometer type. This type comprises a fixed coil and a movable coil having attached to it an indicating member. The terminals of the movable coil are connected at 63 and 64 of Fig. 7, and the fixed coil has impressed on it an alternating reference voltage which should be of the same frequency as the frequency of source 51.

A convenient manner of adjusting and calibrating a dynamometer type of instrument for this purpose is described in more detail in my copending application, Serial No. 551,598.

Figure 1A:
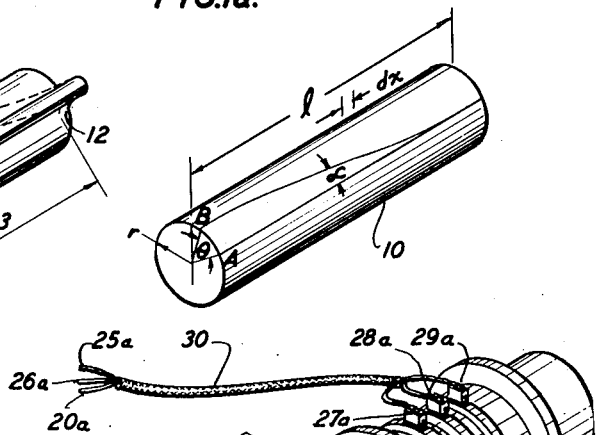
Fig. 1a is a diagram showing the twist of the main shaft in Fig. 1.

It is not necessary to use the permeability indicator described in connection with Fig. 7 in order to obtain indications of the torsion stress on the gauge rod. Some other convenient form of indicator might be used instead if desired. Fig. 8 shows, for example, a strain gauge type of indicator applied to the rod under stress. In Fig. 8 there is shown a portion of each of the rods 13 and 23 of Fig. 2. A wire strain gauge is applied to each of these rods in a well known manner. The strain gauge applied to rod 13 comprises a length of fine wire 65, carried back and forth a number of times as shown, and laid flat against the surface of the rod. A suitable wax or cement is applied to this wire arrangement so as to maintain the wire against the surface. When the surface of the rod is strained as indicated by Fig. 1a, the strain gauge wire is also strained, for example, in tension or compression, producing a change of resistance in the wire in a well known manner which can be measured by measuring its resistance. This change in resistance can be ascertained in a well known manner, for example, by balancing the resistance of strain gauge 65 against another resistance, in a bridge circuit. For convenience, this other comparison resistance may be another strain gauge such as strain gauge 68 applied to the other rod 23 in the same manner that strain gauge 65 is applied to rod 13. Strain gauge 68 will remain unstrained, and therefore be a constant resistance while strain gauge 65 is undergoing strain.

It will be recognized that by my invention I have provided a convenient and effective means for measuring the torsion force on a shaft on which it might otherwise be very inconvenient to make the measurement. By applying my gauge rod or shaft to the power shaft or other shaft under test, I do not have to obtain any calibration of the power shaft, but simply may have the gauge shaft calibrated to particular type of indicator used on the gauge shaft.

I claim:

1. Means for indicating the angular twist of a shaft subject to torque, comprising a gauge rod having a cross section of the same shape as the cross section of the shaft, means for fastening the gauge rod at two separated points to the shaft in a position parallel to the longitudinal axis of the shaft and spaced from the shaft, the length of the gauge rod between said separated points being the same as the length of the shaft between said points, and means connected to the gauge rod and unconnected to the shaft measuring the amount of twist on the gauge rod between said points when torque is applied to the shaft.

2. Means for indicating the stress which a shaft undergoes when subjected to torque, comprising a gauge rod of magnetic material, means for fastening the gauge rod at two separated points to the shaft in a position parallel to the longitudinal axis on the shaft and spaced from the shaft so that the twist of the shaft results in corresponding twist of the gauge rod, and a change of permeability of the gauge rod between said points, an inductance coil inductively related to the gauge rod between said points, and means for measuring the change of inductance of the coil due to the change of permeability of the gauge rod when torque is applied to the shaft.

3. In combination with a shaft of circular cross section subjected to torque, a gauge rod of circular cross section and having the same modulus of elasticity as the shaft, said rod being mounted parallel to the shaft at a spaced distance from it and rigidly fastened at two separated places to the shaft, the length of the gauge rod between said separated places being the same as the length of the shaft between said separated places and means for measuring the twist of the gauge rod between said two places when torque is applied to the shaft.

4. In combination, a rotatable shaft subjected to torque, a gauge rod of magnetic material fastened to the shaft at two separated places and held parallel to the longitudinal axis of the shaft and spaced from the shaft so that the twist of the shaft results in corresponding twist and change of permeability of the gauge rod between said places, an inductance coil inductively related to the gauge rod between said places, slip ring means mounted on the shaft and brushes in contact with the slip rings, the terminals of the coil being connected with respective ones of the slip rings, whereby the change of inductance of the coil due to the change of permeability when the shaft is subjected to torque and the gauge rod is stressed accordingly, can be indicated by connecting indicating means to the brushes.

5. Means for indicating the stress which a shaft undergoes when subjected to torque, which comprises a plurality of gauge rods, means for fastening said gauge rods to said shaft in a position parallel to the longitudinal axis of said shaft and spaced from said shaft, one-half of said gauge rods being rigidly fastened at both ends thereof, the other half of said gauge rods being free to avoid twisting movement induced by the torque on said shaft, an inductance coil inductively related to each of said plurality of gauge rods and means for comparing the inductance of the coils related to said one half of said gauge rods rigidly fastened at both ends thereof with the inductance of the coils related to said other half of said gauge rods.

6. Means for indicating stress which a shaft undergoes when subjected to torque which comprises two gauge rods of magnetically permeable material, means for fastening said gauge rods in spaced relationship to said shaft in a position parallel to the longitudinal axis of said shaft, one of said gauge rods being rigidly fastened at both ends thereof so as to undergo the same twisting movement as said shaft, the other of said gauge rods being free to avoid said twisting movement induced by the torque on said shaft, an inductance coil inductively related to each of said two gauge rods, and a means for comparing the inductance of the coil related to one of said gauge rods, with the inductance of the coil related to the other of said gauge rods.

7. Means for indicating the angular twist of a shaft subject to torque, said means comprising a gauge rod rigidly fastened to the outside of the shaft at two separated positions of the shaft and parallel to the longitudinal axis of the shaft and measuring means connected to the gauge rod and unconnected to the shaft, which measures the amount of twist of the gauge rod when torque is applied to the shaft.

EDGAR T. HOWES.

REFERENCES CITED

The following references are of record in the file of this patent:

UNITED STATES PATENTS

| Number | Name | Date |
|---|---|---|
| 1,425,190 | FitzGerald | Aug. 8, 1922 |
| 2,173,039 | Muir | Sept. 12, 1939 |
| 2,260,036 | Kuehni | Oct. 21, 1941 |
| 2,359,125 | Langer et al. | Sept. 26, 1944 |
| 2,365,564 | Langer | Dec. 19, 1944 |
| 2,392,293 | Ruge | Jan. 1, 1946 |
| 2,397,935 | Gardiner et al. | Aug. 9, 1946 |

FOREIGN PATENTS

| Number | Country | Date |
|---|---|---|
| 442,441 | Great Britain | Feb. 3, 1936 |
| 482,081 | Great Britain | Mar. 23, 1938 |